United States Patent Office 3,446,479
Patented May 27, 1969

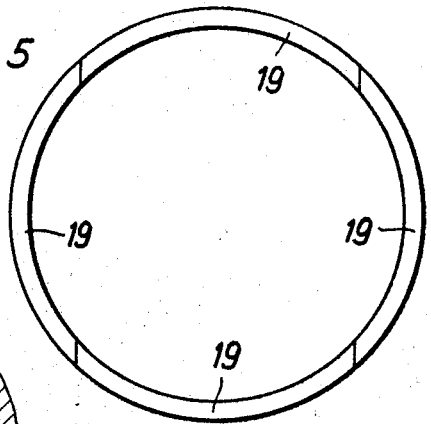
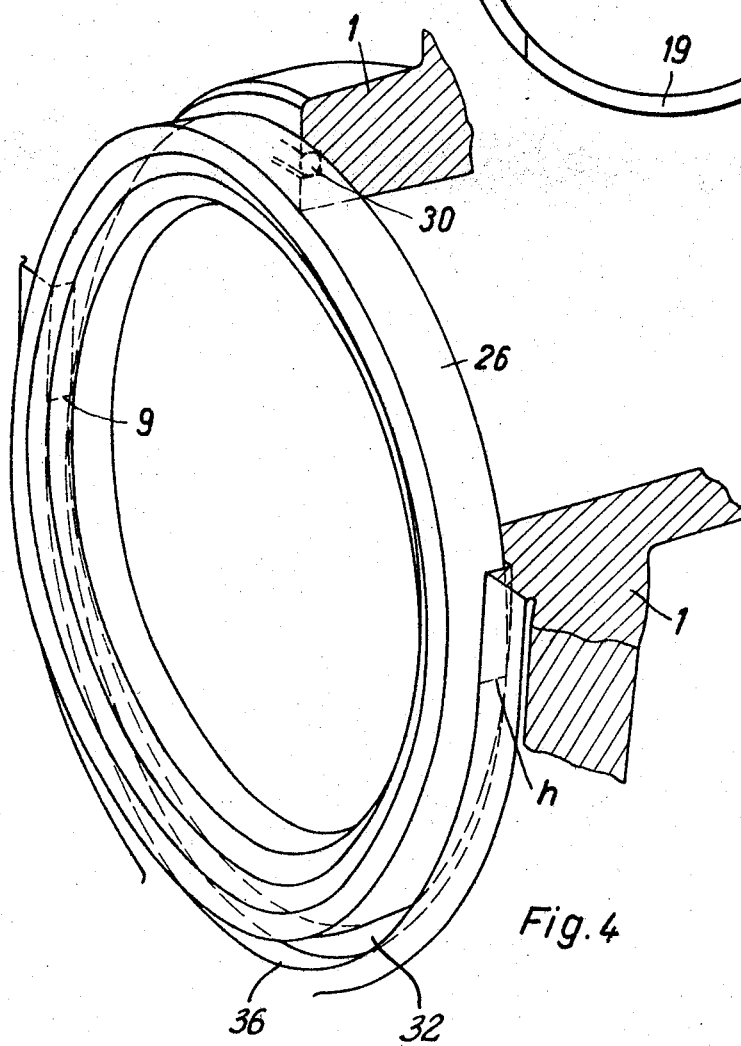

---

3,446,479
VALVE WITH BALL-SHAPED STOP COCK
Heinz Boldt, Berlin-Charlottenburg, Germany, assignor to Borsig Aktiengesellschaft, Berlin-Tegel, Germany
Filed Dec. 1, 1965, Ser. No. 510,867
Int. Cl. F16k 5/06, 27/06
U.S. Cl. 251—315                     5 Claims

ABSTRACT OF THE DISCLOSURE

A valve with ball-shaped stop cock and a one-piece housing in which the ball cock is provided with two bearing studs journalled in the valve housing and cover thereof respectively while two seating rings are so arranged in said housing that they are able to slide in the direction of the axis of the ball cock, and that the outer cylindrical surfaces of the seating rings are in line contact with surfaces parallel to the ball cock axis and forming upwardly directed extensions of semicylindrical surfaces, the housing cover being adapted by means of an adjusting screw arranged in the bottom of the valve housing to be clamped together with a multi-sectional insert ring through the intervention of the ball cock and an annular disc.

---

The present invention relates to a valve with a ball-shaped stop cock which is journalled in an undivided valve housing by means of two bearing studs while the throughflow valve bore in the housing is sealed relative to said stop cock by seating rings which are displaceable in the direction of the said bore and which are mounted so as to seal relative to the housing and said stop cock. The valve is preferably but not exclusively intended for high pressures and small diameters.

Valves of the above mentioned general type with undivided valve housing are known. However, these valves are relatively expensive because they require special guiding bushings provided with threads and recesses or the guiding bushings have to be displaced by other elements in order to move the seating rings which carry the sealing rings into their sealing position.

It is, therefore, an object of the present invention to provide a valve with ball-shaped stop cock, which will overcome the above-mentioned drawback.

It is another object of this invention to provide a valve with ball-shaped stop cock which will not require special guiding bushings and will thus simplify the design of valves of the type involved over heretofore known valves of this general type.

These and other objects and advantages of the invention will appear more clearly from the following specification in connection with the accompanying drawings, in which:

FIG. 4 shows a seating ring employed according to the present invention, on a somewhat larger scale than in FIG. 1, and its engagement with the housing.

FIG. 5 illustrates a multi-sectional insert ring employed in conformity with the present invention.

Figure 1:
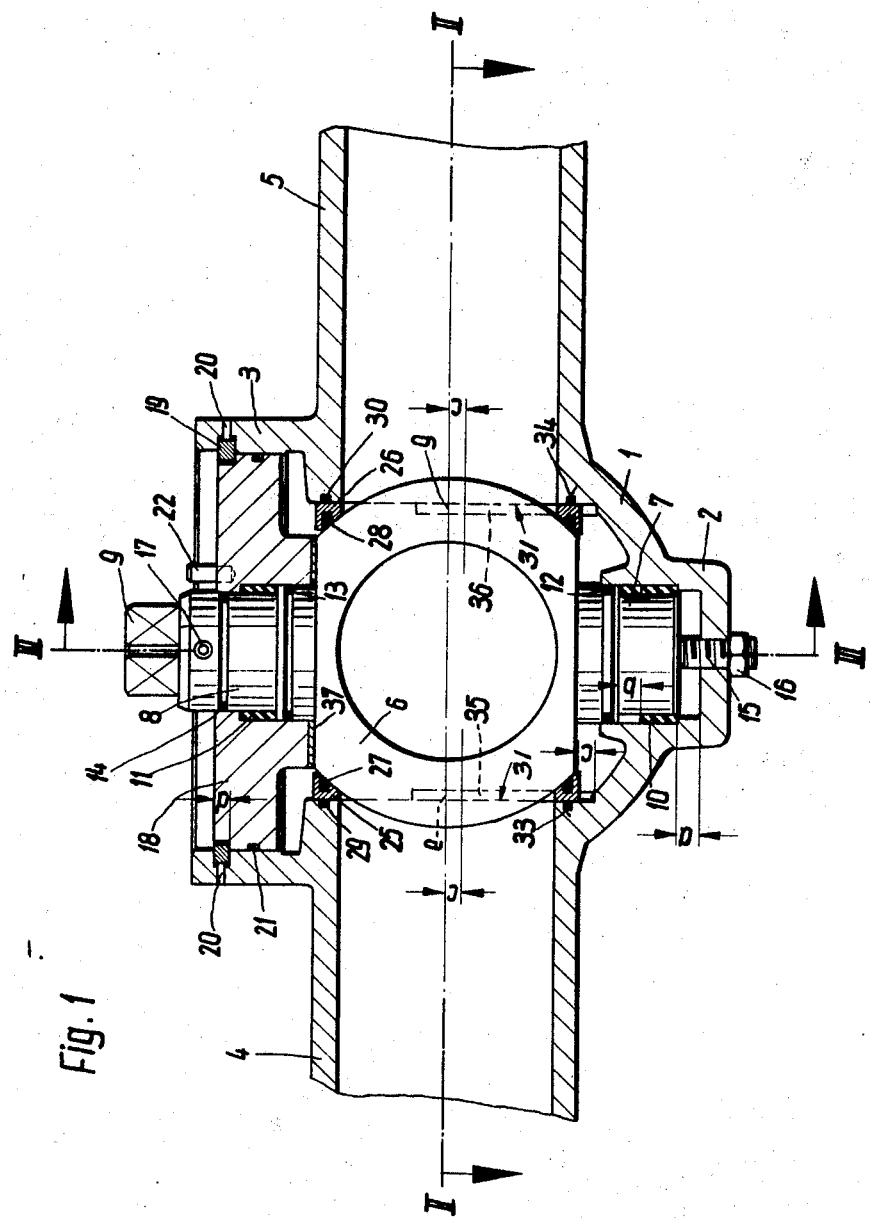
FIG. 1 represents a section taken along the line I—I of FIG. 2 and shows the stop valve in its closing position.
Figure 2:
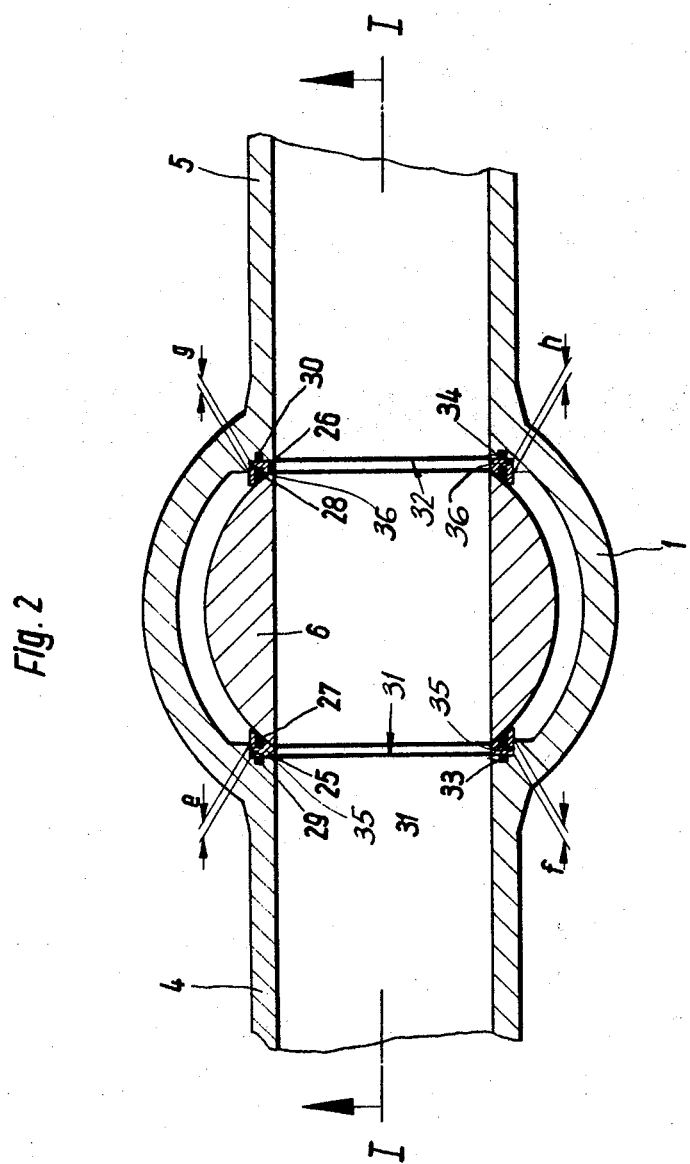
FIG. 2 is a section taken along the line II—II of FIG. 1 and shows the stop valve in its open position.

For purposes of realizing the objects of the present invention, only the displaceable seating rings with the sealing rings sealingly engaging the stop cock, and the elastic sealing rings arranged between the valve housing and the seating rings have been provided between the valve housing and the stop cock. The sealing effect is realized by the pressure of the fluid medium acting upon the effective circular surfaces of the sealing rings between the latter and the housing and by the preload produced by the elastic sealing rings which deform in view of the unilateral pressure in the line.

According to the present invention, the housing is provided with machined parallel plane surfaces extending perpendicular to the direction of flow of fluid through the valve, which surfaces have inner circular passages which advantageously may equal or may exceed the line diameter. In order to avoid any interference with the through flow, the said machined housing surfaces serve during the assembly or disassembly of the ball cock as guiding means for the annular surfaces of the seating rings which face the valve housing and also serve as bearing means for the elastic sealing rings when the valve is in operation.

In order during actuation of the stop valve to prevent the seating rings from being tilted by the frictional forces between the ball-shaped stop cock and the sealing rings, further housing surfaces are provided on the above mentioned housing surfaces which extend vertically upwardly and downwardly from the central plane of the housing and are in line contact with the seating rings at the horizontal central plane of the housing on both sides of the seating rings so that depending on the direction in which the valve is actuated, one or the other housing lines on the inflow or outflow side of the cock will be able to absorb the frictional forces on the ball-shaped stop cock.

According to a further development of the present invention, it is possible to save the cover holding plate and the screws over heretofore known valves of the type involved which, for purposes of closing the cylindrical inlet side for the stop cock employ primarily a cover, a multiple insert ring, a cover holding plate and screws for bracing these parts.

According to one embodiment of the present invention, the machined plane housing surfaces which are parallel to each other and perpendicular to the direction of the through flow have a semi-cylindrical shape with extended parallel straight end planes. Other machined housing surfaces which are perpendicular to said last mentioned housing surfaces form along their entire length parts of the outer confinements for said last mentioned surfaces which means they are located parallel to the through flow direction, start from the bottom side of the valve housing and form eccentrically located half cylindrical surfaces the eccentricity of which is directed parallel to the axis of the stop cock in the direction of the bottom of the valve housing while merging at both sides of the half cylinder with parallel plane strip-shaped surfaces which start in the horizontal plane through the center points of the eccentrics and while being directed vertically, penetrate the horizontal central plane of the valve housing and end in the upper half of the valve housing. The diameter of the inner semi-cylindrical surfaces and the distances of the parallel strip-shaped surfaces of each pair of surface strips equal the outer diameters of the seating rings so that the outer cylindrical surface of the seating rings are in line contact with the parallel strips in order, as mentioned above, to avoid tilting of the seating rings while the stop cock is being actuated.

In order to be able to install the multi-part insert ring in the neck of the valve housing, which ring is intended during the operation to hold the valve housing cover, the stop cock according to the invention as illustrated in the drawing is so designed that during the assembly or disassembly, the stop cock with the seating rings, sealings, bearings and the cover can be lowered into the valve housing so that the upper edge of the cover will be located below or at least at the level of the lower edge of the annular groove for the multi-part insert ring.

When the valve is fully assembled and no pressure prevails in the valve housing, the cover is, in conformity with the invention, together with the multi-part insert ring, clamped together by the ball-shaped stop cock and a circular ring disc acting like a pressure bearing. This is accomplished solely by means of an adjusting screw which presses against the bearing stud of the stop cock adjacent the bottom of the valve.

Referring more specifically to the drawing, the valve housing 1 is provided with a bottom 2, a neck 3 and tubular sections 4 and 5 which may each be provided with detachable or non-detachable pipe connecting elements known per se. The ball-shaped stop cock 6 is provided with bearing studs 7 and 8 which latter has a square head 9 for receiving a wrench or the like in order to actuate said stop cock 6. The torque required for adjusting stop cock 6 may be produced manually by a wrench or mechanically by means of an electric motor through the intervention of a corresponding transmission. Bearing studs 7 and 8 are journalled in bearings 10 and 11 which may, for instance, be of synthetic material such as "Teflon."

The valve shown in the drawing furthermore comprises sealing means 12 and 13, for instance, O-rings, for sealing the bearing studs 7 and 8 with regard to housing 1, cover 18 and bearings 10 and 11. Seal 14, for instance, an O-ring, serves for sealing bearing 11 toward the outside. An adjusting screw 15, for instance a threaded pin with an inner hexagonal recess or slot presses against cover 18 through the intervention of bearing stud 7, cock 6 and circular disc 37 acting in the manner of a pressure bearing. Disc 37 may consist of synthetic material such as "Teflon."

As a result thereof, even when a pressure-less condition prevails in valve housing 1, cover 18 is continuously clamped together with the multi-part insert ring 19.

Figure 3:
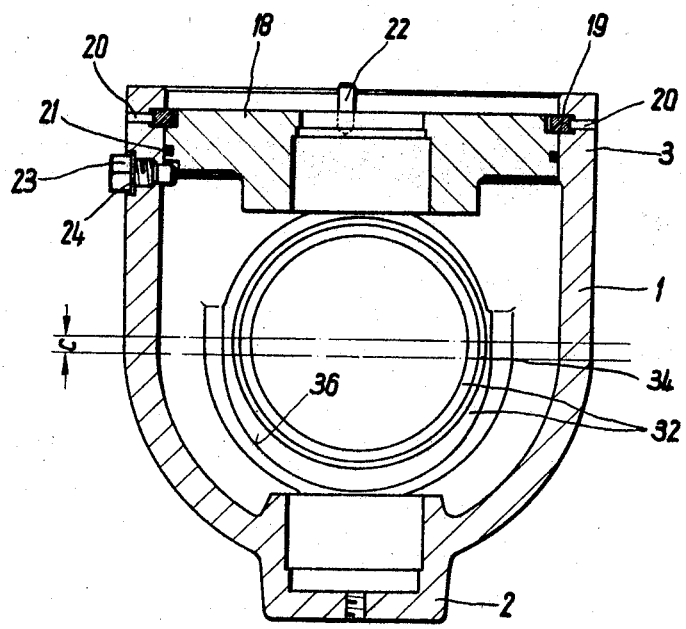
FIG. 3 is a section along the line III—III of FIG. 1 with the stop cock omitted.

An arresting nut 16 holds adjusting screw 15 in its desired position. Bores 20 in neck 2 permit a simple removal of the individual parts of the insert ring 19 during disassembly operations. Seal 21, for instance an O-ring, seals cover 18 with regard to valve housing 1. An abutment 17 on bearing stud 8 and the two abutments 22 in cover 18 limit the rotation of stop cock 6 and define the open and closed positions. The arresting and venting screw 23 (FIG. 3) prevents cover 18 from turning when cock 6 is turned and permits the venting of the valve housing 1, whereas seal or washer 24 seals screw 23 with regard to the valve housing 1.

Seating rings 25 and 26 designed as bodies of revolution have mounted therein sealing rings 27 and 28 for sealing engagement with valve cock 6. Said rings 27 and 28 may consist of synthetic material such as "Teflon" or any other suitable material. Elastic sealing rings 29 and 30, for instance, O-rings, are arranged in grooves 33 and 34 of valve housing 1 or may be arranged in the seating rings 25 and 26. Said rings 29 and 30 seal the sealing rings 25 and 26 with regard to the valve housing 1 and, due to the fact that they will deform under the pressure of the fluid medium conveyed to the valve, represent preloading elements which, depending on the variable line pressure, produce a variable load on the seating rings 25 and 26 thereby pressing the sealing rings 27 and 28 under a preload against cock 6. To these preloads have to be added the pressures which result from the pressure of the fluid medium upon the effective circular surfaces of the seating rings between the inner diameter of the seating rings and the elastic sealing rings 29 and 30. The total of these loads form the total sealing pressure of the sealing rings 27 and 28 which is exerted upon the ball-shaped valve cock 6.

The housing surfaces 31 and 32 are machined, crescent-shaped and plane and extend in a direction perpendicular to the through-flow direction while being arranged parallel to each other. These housing surfaces 31 and 32 are provided with passages equalling the line diameter. The said surfaces 31 and 32 will during the assembly and disassembly of the cock 6 serve as guiding means. The circular grooves 33 and 34 in the housing surfaces are intended for receiving the elastic sealing rings 29 and 30.

The machined housing surfaces 35 and 36 are perpendicular to the housing surfaces 31 and 32 and along their entire length form a part of the outer confinements of the housing surfaces 31 and 32, in other words, are parallel to the through-flow direction and start from the bottom side of the housing as eccentrically arranged semi-cylindrical surfaces the eccentricities $c$ of which point in a direction parallel to the axis of the cock toward the bottom and merge at both sides of the semi-cylinder with parallel plane strip surfaces. These strip surfaces start in the horizontal plane through the center points of the eccentricities—vertically directed—pass through the horizontal central plane of the valve housing 1 and end at the upper half of the valve housing 1. The diameters of the inner semi-cylindrical surfaces and the distances between the parallel strip surfaces of each pair of strip surfaces equal the outer diameters of the seating rings 25 and 26 so that the outer cylindrical surface of the seating rings 25 and 26 are in line contact with the parallel strips on the areas $e$, $f$, $g$ and $h$ in the horizontal central plane. Of the areas $e$, $f$, $g$ and $h$, depending on the direction of turning of cock 6, during the turning operation, two areas form the supports for the seating rings 25 and 26 and thus absorb the frictional surfaces on the circumference between cock 6 and rings 27 and 28 so that a tilting of the seating rings 25 and 26 will be prevented.

In order to permit an assembly and disassembly of the multi-part insert rings 19, it is required that the areas $a$, $b$, and $c$ shown in FIG. 1 are greater than or at least equal the distance $d$ of the upper edge of cover 18 from the lower edge of the annular groove for the multi-part insert ring 19.

What I claim is:

1. In combination in a valve: a one piece housing having two axially spaced tubular sections for connection with fluid conveying conduits and also having an intermediate section, a stop cock rotatably mounted in said intermediate section and operable selectively to establish and interrupt fluid communication between said tubular sections, said intermediate section having an opening for insertion of said cock into and removal of said cock from said intermediate section, cover means detachably mounted in said opening, a pair of seating ring means arranged on opposite sides of said cock with the axes of said seating ring means extending in the direction of flow of fluid from one tubular section to the other tubular section, first sealing ring means respectively supported by said seating ring means and sealingly engaging said cock, second sealing ring means, said second sealing ring means being elastic and being arranged between said housing and the respective adjacent seating ring means, said housing adjacent said seating ring means respectively being provided with substantially parallel plane first machined surfaces respectively defining planes substantially perpendicular to the direction of flow of fluid from one tubular section to the other tubular section, said first surfaces being adapted to slidably engage that surface of the respective adjacent seating ring means which faces toward the respective adjacent tubular section, said housing also being provided with second machined surfaces extending substantially perpendicularly with regard to said first machined surfaces and on opposite sides of a central longitudinal plane through said tubular sections, said second machined surfaces being in line contact with the respective adjacent seating ring means so that the seating ring means in condition of operation of said valve are movable in the direction of flow of fluid from one tubular section to the other tubular section and perpendicularly with regard to said last mentioned direction parallel to the axis of rotation of said cock and are supported along said line contact during a turning operation of said cock.

2. A valve structure according to claim 1, in which said first machined surfaces have the shape of a crescent.

3. A valve structure according to claim 1, in which said central section is provided with a bottom, while said cock is provided with stud means respectively journalled in said bottom and said cover means, and in which each of said second machined surfaces comprises a semicylindrical section and two plane wall sections respectively located at the two free ends of said semicylindrical section, both of said two plane wall sections being parallel to each other and being spaced from each other by a distance equalling the outer diameter of said seating ring means, the axis of said semicylindrical section being eccentrically offset with regard to the longitudinal axis of said valve housing in the direction toward said bottom.

4. A valve structure according to claim 3, in which said cover and the adjacent portion of said housing are provided with groove means while a multi-sectional insert ring is inserted in said groove means of said housing and said cover, and in which said bottom has bearing means mounted therein journalling that stud means which is adjacent said bottom while said last mentioned stud means is provided with a groove and a sealing ring therein for sealing said bearing means, the distance between said bottom and said last mentioned stud means and the distance of said bearing means from that surface of said sealing ring which faces away from said bottom and the eccentricity of the inner semicylindrical surface of said second surfaces equalling at least the distance between the outer surface of said cover and that surface of said multi-sectional ring receiving groove means which is remote from said outer cover surface.

5. A valve structure according to claim 1, in which said housing has a bottom, and in which said cock has stud means respectively journalled in said bottom and said cover, said cover and said housing being provided with groove means, a multi-sectional insert ring arranged in said groove means of said cover and said housing, and adjustable screw means extending from the outside of said housing through said bottom and operable to exert pressure upon the adjacent stud means and through the latter upon said cover so as to firmly clamp said multi-sectional insert ring between the latter and said housing.

References Cited
UNITED STATES PATENTS

| | | | |
|---|---|---|---|
| 587,439 | 8/1897 | Jenkins | 251—328 X |
| 880,463 | 2/1908 | Paul | 251—328 |
| 2,829,862 | 4/1958 | Wey | 251—328 |

M. CARY NELSON, *Primary Examiner.*

JOHN R. DWELLE, *Assistant Examiner.*